(12) United States Patent
Bajpai et al.

(10) Patent No.: US 8,099,755 B2
(45) Date of Patent: Jan. 17, 2012

(54) SYSTEMS AND METHODS FOR CONTROLLING THE ENCODING OF A MEDIA STREAM

(75) Inventors: Parimal Bajpai, Bangalore (IN); Harish Nair Rajagopal, Trivandrum (IN); Vineet Govil, Bangalore (IN); Senthilkumar Krishnadoss, Pondicherry (IN)

(73) Assignee: Sling Media PVT. Ltd., Bangalore (IN)

( * ) Notice: Subject to any disclaimer, the term of this patent is extended or adjusted under 35 U.S.C. 154(b) by 523 days.

(21) Appl. No.: 12/339,878

(22) Filed: Dec. 19, 2008

(65) Prior Publication Data

US 2009/0103607 A1   Apr. 23, 2009

Related U.S. Application Data

(63) Continuation-in-part of application No. 11/147,663, filed on Jun. 7, 2005, now Pat. No. 7,707,614.

(60) Provisional application No. 60/577,833, filed on Jun. 7, 2004.

(51) Int. Cl.
 *H04N 7/173* (2011.01)
(52) U.S. Cl. .............. 725/94; 725/80; 725/87; 725/110
(58) Field of Classification Search .............. 725/80, 725/87, 93, 94, 110; 386/112
See application file for complete search history.

(56) References Cited

U.S. PATENT DOCUMENTS

| | | | |
|---|---|---|---|
| 3,416,043 A | 12/1968 | Jorgensen | |
| 4,254,303 A | 3/1981 | Takizawa | |
| 5,132,992 A | 7/1992 | Yurt et al. | |
| 5,161,021 A | 11/1992 | Tsai | |
| 5,237,648 A | 8/1993 | Mills et al. | |
| 5,321,846 A | 6/1994 | Yokota et al. | |
| 5,386,493 A | 1/1995 | Degen et al. | |
| 5,434,590 A | 7/1995 | Dinwiddie, Jr. et al. | |
| 5,493,638 A | 2/1996 | Hooper et al. | |
| 5,602,589 A | 2/1997 | Vishwanath et al. | |
| 5,661,516 A | 8/1997 | Carles | |
| 5,666,426 A | 9/1997 | Helms | |
| 5,682,195 A | 10/1997 | Hendricks et al. | |
| 5,706,290 A | 1/1998 | Shaw et al. | |
| 5,708,961 A | 1/1998 | Hylton et al. | |

(Continued)

FOREIGN PATENT DOCUMENTS

CN    1464685    12/2003

(Continued)

OTHER PUBLICATIONS

Malone, Edward D. et al. "Systems and Methods for Controlling Media Devices," U.S. Appl. No. 12/256,344, filed Oct. 22, 2008.

(Continued)

*Primary Examiner* — Hunter Lonsberry (74) *Attorney, Agent, or Firm* — Ingrassia Fisher & Lorenz, P.C.

(57) ABSTRACT

Systems and methods are described for providing a media stream transmitted from an encoding system to a remotely-located media player. The media stream is encoded according to an encoding parameter. Data is gathered about a transmit buffer within the encoding system, and the gathered data is processed to arrive at an estimate of network capacity and a calculated encoder rate. The encoding parameter is adjusted during subsequent encoding in response to a change in at least one of the estimate of network capacity and the calculated encoder rate.

18 Claims, 3 Drawing Sheets

U.S. PATENT DOCUMENTS

| | | | |
|---|---|---|---|
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,788,882 B1 | 9/2004 | Geer et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,565,681 B2 | 7/2009 | Ngo et al. |
| 7,583,676 B2 | 9/2009 | Shobatake |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0019984 A1 | 2/2002 | Rakib |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0080753 A1 | 6/2002 | Lee |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |

| | | | | | | |
|---|---|---|---|---|---|---|
| 2002/0131497 A1 | 9/2002 | Jang | | 2007/0180485 A1 | 8/2007 | Dua |
| 2002/0138843 A1 | 9/2002 | Samaan et al. | | 2007/0198532 A1 | 8/2007 | Krikorian et al. |
| 2002/0143973 A1 | 10/2002 | Price | | 2007/0234213 A1 | 10/2007 | Krikorian et al. |
| 2002/0147634 A1 | 10/2002 | Jacoby et al. | | 2007/0260462 A1 | 11/2007 | Andersen et al. |
| 2002/0147687 A1 | 10/2002 | Breiter et al. | | 2007/0286596 A1 | 12/2007 | Lonn |
| 2002/0151992 A1 | 10/2002 | Hoffberg et al. | | 2008/0019276 A1 | 1/2008 | Takatsuji et al. |
| 2002/0167458 A1 | 11/2002 | Baudisch et al. | | 2008/0037573 A1 | 2/2008 | Cohen |
| 2002/0188818 A1 | 12/2002 | Nimura et al. | | 2008/0059533 A1 | 3/2008 | Krikorian |
| 2002/0191575 A1 | 12/2002 | Kalavade et al. | | 2008/0134267 A1 | 6/2008 | Moghe et al. |
| 2003/0001880 A1 | 1/2003 | Holtz et al. | | 2008/0195744 A1 | 8/2008 | Bowra et al. |
| 2003/0028873 A1 | 2/2003 | Lemmons | | 2008/0199150 A1 | 8/2008 | Candelore |
| 2003/0065915 A1 | 4/2003 | Yu et al. | | 2008/0294759 A1 | 11/2008 | Biswas et al. |
| 2003/0078973 A1 | 4/2003 | Przekop et al. | | 2008/0307456 A1 | 12/2008 | Beetcher et al. |
| 2003/0088686 A1 | 5/2003 | Jennings | | 2008/0307462 A1 | 12/2008 | Beetcher et al. |
| 2003/0093260 A1 | 5/2003 | Dagtas et al. | | 2008/0307463 A1 | 12/2008 | Beetcher et al. |
| 2003/0095791 A1 | 5/2003 | Barton et al. | | 2009/0074380 A1 | 3/2009 | Boston et al. |
| 2003/0115167 A1 | 6/2003 | Sharif et al. | | 2009/0199248 A1 | 8/2009 | Ngo et al. |
| 2003/0159143 A1 | 8/2003 | Chan | | 2010/0100915 A1 | 4/2010 | Krikorian et al. |
| 2003/0187657 A1 | 10/2003 | Erhart et al. | | | | |
| 2003/0192054 A1 | 10/2003 | Birks et al. | | | | |
| 2003/0208612 A1 | 11/2003 | Harris et al. | | | | |
| 2003/0231621 A1 | 12/2003 | Gubbi et al. | | | | |
| 2004/0003406 A1 | 1/2004 | Billmaier | | | | |
| 2004/0052216 A1 | 3/2004 | Roh | | | | |
| 2004/0068334 A1 | 4/2004 | Tsai et al. | | | | |
| 2004/0083301 A1 | 4/2004 | Murase et al. | | | | |
| 2004/0100486 A1 | 5/2004 | Flamini et al. | | | | |
| 2004/0103340 A1 | 5/2004 | Sundareson et al. | | | | |
| 2004/0139047 A1 | 7/2004 | Rechsteiner et al. | | | | |
| 2004/0162845 A1 | 8/2004 | Kim et al. | | | | |
| 2004/0162903 A1 | 8/2004 | Oh | | | | |
| 2004/0172410 A1 | 9/2004 | Shimojima et al. | | | | |
| 2004/0205830 A1 | 10/2004 | Kaneko | | | | |
| 2004/0212640 A1 | 10/2004 | Mann et al. | | | | |
| 2004/0216173 A1 | 10/2004 | Horoszowski et al. | | | | |
| 2004/0236844 A1 | 11/2004 | Kocherlakota | | | | |
| 2004/0246936 A1 | 12/2004 | Perlman | | | | |
| 2004/0255249 A1 | 12/2004 | Chang et al. | | | | |
| 2005/0021398 A1 | 1/2005 | McCleskey et al. | | | | |
| 2005/0027821 A1 | 2/2005 | Alexander et al. | | | | |
| 2005/0038981 A1 | 2/2005 | Connor et al. | | | | |
| 2005/0044058 A1 | 2/2005 | Matthews et al. | | | | |
| 2005/0050462 A1 | 3/2005 | Whittle et al. | | | | |
| 2005/0053356 A1 | 3/2005 | Mate et al. | | | | |
| 2005/0055595 A1 | 3/2005 | Frazer et al. | | | | |
| 2005/0060759 A1 | 3/2005 | Rowe et al. | | | | |
| 2005/0097542 A1 | 5/2005 | Lee | | | | |
| 2005/0114852 A1 | 5/2005 | Chen et al. | | | | |
| 2005/0132351 A1 | 6/2005 | Randall et al. | | | | |
| 2005/0138560 A1 | 6/2005 | Lee et al. | | | | |
| 2005/0198584 A1 | 9/2005 | Matthews et al. | | | | |
| 2005/0204046 A1* | 9/2005 | Watanabe ............... 709/228 | | | | |
| 2005/0216851 A1 | 9/2005 | Hull et al. | | | | |
| 2005/0227621 A1 | 10/2005 | Katoh | | | | |
| 2005/0229118 A1 | 10/2005 | Chiu et al. | | | | |
| 2005/0246369 A1 | 11/2005 | Oreizy et al. | | | | |
| 2005/0251833 A1 | 11/2005 | Schedivy | | | | |
| 2005/0262534 A1 | 11/2005 | Bontempi et al. | | | | |
| 2005/0283791 A1 | 12/2005 | McCarthy et al. | | | | |
| 2005/0288999 A1 | 12/2005 | Lerner et al. | | | | |
| 2006/0011371 A1 | 1/2006 | Fahey | | | | |
| 2006/0031381 A1 | 2/2006 | Van Luijt et al. | | | | |
| 2006/0050970 A1 | 3/2006 | Gunatilake | | | | |
| 2006/0051055 A1 | 3/2006 | Ohkawa | | | | |
| 2006/0095401 A1 | 5/2006 | Krikorian et al. | | | | |
| 2006/0095471 A1 | 5/2006 | Krikorian et al. | | | | |
| 2006/0095472 A1 | 5/2006 | Krikorian et al. | | | | |
| 2006/0095942 A1 | 5/2006 | Van Beek | | | | |
| 2006/0095943 A1 | 5/2006 | Demircin et al. | | | | |
| 2006/0107226 A1 | 5/2006 | Matthews et al. | | | | |
| 2006/0117371 A1 | 6/2006 | Margulis | | | | |
| 2006/0146174 A1 | 7/2006 | Hagino | | | | |
| 2006/0280157 A1 | 12/2006 | Karaoguz et al. | | | | |
| 2007/0003224 A1 | 1/2007 | Krikorian et al. | | | | |
| 2007/0005783 A1 | 1/2007 | Saint-Hillaire et al. | | | | |
| 2007/0022328 A1 | 1/2007 | Tarra et al. | | | | |
| 2007/0074115 A1 | 3/2007 | Patten et al. | | | | |
| 2007/0076604 A1 | 4/2007 | Litwack | | | | |
| 2007/0168543 A1 | 7/2007 | Krikorian et al. | | | | |

FOREIGN PATENT DOCUMENTS

| | | |
|---|---|---|
| CN | 1464685 A | 12/2003 |
| DE | 4407319 A1 | 9/1994 |
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| GB | 2307151 A | 5/1997 |
| JP | 2003046582 A | 2/2003 |
| JP | 2003114845 A | 4/2003 |
| JP | 2004015111 A | 1/2004 |
| JP | 2005032120 | 2/2005 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 2006074110 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | 2008024723 A | 2/2008 |

OTHER PUBLICATIONS

Rao, Padmanabha R. "Systems and Methods for Linking Media Content," U.S. Appl. No. 12/359,784, filed Jan. 26, 2009.
Banger, Shashidhar et al. "Systems and Methods for Determining Attributes of Media Items Accessed Via a Personal Media Broadcaster," U.S. Appl. No. 12/334,959, filed Dec. 15, 2008.
Kulkarni, Anant Madhava "Systems and Methods for Creating Logical Media Streams for Media Storage and Playback," U.S. Appl. No. 12/323,907, filed Nov. 26, 2008.
Krikorian, Blake Gary et al. "Systems and Methods for Projecting Images From a Computer System," U.S. Appl. No. 12/408,460, filed Mar. 20, 2009.
Krikorian, Blake Gary et al. "Systems and Methods for Presenting Media Content Obtained From Multiple Sources," U.S. Appl. No. 12/408,456, filed Mar. 20, 2009.
International Search Report and Written Opinion for International Application No. PCT/US2008/080910, mailed Feb. 16, 2009.
International Search Report and Written Opinion for International Application No. PCT/US2006/025911, mailed Jan. 3, 2007.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025912, mailed Jul. 17, 2008.

International Search Report for International Application No. PCT/US2008/059613, mailed Jul. 21, 2008.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Capable Networks LLC "Keyspan Remote Control—Controlling Your Computer with a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Wikipedia "LocationFree Player" [Online], Sep. 22, 2007, XP002512400; retrieved from the Internet: <URL:http://en.wikipedia.org/w/index.php?title=LocationFree_Player&oldid=159683564>; retrieved on Jan. 28, 2009.
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
China State Intellectual Property Office "First Office Action," issued Jan. 8, 2010, for Application No. 200810126554.0.
USPTO Final Office action mailed Jan. 25, 2010; U.S. Appl. No. 11/734,277, filed Apr. 12, 2007.
Australian Government "Office Action," Australian Patent Application No. 2006240518, mailed Nov. 12, 2009.
Jain, Vikal Kumar "Systems and Methods for Coordinating Data Communication Between Two Device," U.S. Appl. No. 12/699,280, filed Feb. 3, 2010.
Gangotri, Arun L. et al. "Systems and Methods and Program Applications for Selectively Restructuring the Placeshifitnig of Copy Protected Digital Media Content," U.S. Appl. No. 12/623,955, filed Nov. 23, 2009.
Paul, John et al. "Systems and Methods for Searching Media Content," U.S. Appl. No. 12/648,024, filed Dec. 28, 2009.
Newton's Telcom Dictionary, 20th ed., Mar. 2004.
"The Authoritative Dictionary of IEEE Standard Terms," 7th ed. 2000.
Gurzhi, Alexander et al. "Systems and Methods for Emulation Network-Enabled Media Components," U.S. Appl. No. 12/711,830, filed Feb. 24, 2010.
European Patent Office, International Searching Authority, "International Search Report," mailed Mar. 30, 2010; International Application PCT/US2009/068468 filed Dec. 27, 2009.
USPTO Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming Via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
China State Intellectual Property Office "First Office Action of China State Intellectual Property Office," issued Oct. 9, 2010; Application No. 200780030811.4.
European Patent Office "EPO Communication" dated Nov. 29, 2010; Application No. 08 167 880.7-2202.
Korean Intellectual Property Office "Official Notice of Preliminary Rejection," issued Dec. 29, 2010; Patent Application No. 10-2009-7003607.
China State Intellectual Property Office "Second Office Action of China State Intellectual Property Office," issued Aug. 26, 2010; Application No. 200810126554.0.
Krikorian, Jason, U.S. Appl. No. 11/734,277, filed Apr. 12, 2007.
Tarra, Raghuveer et al., U.S. Appl. No. 60/975,239, filed Sep. 26, 2007.
Williams, George Edward, U.S. Appl. No. 12/167,041, filed Jul. 2, 2008.
Rao, Padmanabha R., U.S. Appl. No. 12/166,039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms,"Financial Review, Jul. 1, 2003, [online [Retrieved on Apr. 12, 2006] Retrieved from the Internet, URL:http://afr.com/cgi-bin/ newtextversions.pl?storyid+1056825330084&3ate+2003/07/01&pagetype+printer§ion+1053801318705&path+articles/2003/06/30/0156825330084.html.].

Balster, Eric J., "Video Compression and Rate Control Methods Based on the Wavelet Transform," The Ohio State University 2004, pp. 1-24.

Kulapala et al., "Comparison of Traffic and Quality Characteristics of Rate-Controlled Wavelet and DCT Video," Arizona State University, Oct. 11, 2004.

Skodras et al., "JPEG2000: The Upcoming Still Image Compression Standard," May 11, 2000, 14 pages.

Taubman et al., "Embedded Block Coding in JPEG2000," Feb. 23, 2001, pp. 1-8 of 36.

Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.

Roe, Kevin, "Third-Party Observation Under EPC Article 115 on the Patentability of an Invention," Dec. 21, 2007.

Roe, Kevin, Third-Party Submission for Published Application Under CFR §1.99, Mar. 26, 2008.

China Patent Office "Office Action" mailed Feb. 23, 2011; Chinese Patent Appln. No. 200680022520.6.

China Patent Office "Office Action" mailed Jan. 6, 2911; Chinese Patent Appln. No. 200810126554.0.

USPTO "Non-Final Office Action" mailed Mar. 4, 2011; U.S. Appl. No. 12/757,697, filed Apr. 9, 2010.

USPTO "Final Office Action" mailed Mar. 10, 2011; U.S. Appl. No. 11/111,265, filed Apr. 21, 2005.

Canadian Patent Office "Office Action" mailed Mar. 17, 2011; Canadian Patent Appln. No. 2,606,235.

Sikora, Thomas "Trends and Perspectives in Image and Video Coding," Proceedings of the IEEE, vol. 93 No. 1, pp. 6-17, Jan. 1, 2005.

Vetro, Anthony et al. "Video Transcoding Architectures and Techniques: An Overview," IEEE Signal Processing Magazine, vol. 20, No. 2, pp. 18-29, Mar. 1, 2003.

De Lattre, Alexis et al. "VideoLAN Streaming Howto," Internet Citation, Jan. 22, 2005; http://www.videolan.org/doc/streaming-howto/en/.

European Patent Office, European Search Report for European Application No. EP 08 16 7880, mailed Mar. 4, 2009.

MythTV Wiki, "MythTV User Manual" [Online], Aug. 27, 2007, XP002515046; retrieved from the Internet: <URL: http://www.mythtv.org/wiki?title=User_Manual:Introduction&oldid=25549>.

International Searching Authority, Written Opinion and International Search Report for International Application No. PCT/US2008/077733, mailed Mar. 18, 2009.

International Searching Authority, Written Opinion and International Search Report for International Application No. PCT/US2008/087005, mailed Mar. 20, 2009.

Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.

Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.

Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.

Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.

USPTO, Non-Final Office Action mailed Dec. 17, 2004; U.S. Appl. No. 09/809,868, filed Mar. 15, 2001.

USPTO, Final Office Action mailed Jul. 28, 2005; U.S. Appl. No. 09/809,868, filed Mar. 15, 2001.

USPTO, Non-Final Office Action mailed Jan. 30, 2006; U.S. Appl. No. 09/809,868, filed Mar. 15, 2001.

USPTO, Final Office Action mailed Aug. 10, 2006; U.S. Appl. No. 09/809,868, filed Mar. 15, 2001.

USPTO, Non-Final Office Action mailed Jun. 19, 2007; U.S. Appl. No. 09/809,868, filed Mar. 15, 2001.

USPTO, Non-Final Office Action mailed Apr. 16, 2008; U.S. Appl. No. 09/809,868, filed Mar. 15, 2001.

USPTO, Final Office Action mailed Sep. 18, 2008; U.S. Appl. No. 09/809,868, filed Mar. 15, 2001.

USPTO, Non-Final Office Action mailed Mar. 31, 2009; U.S. Appl. No. 09/809,868, filed Mar. 15, 2001.

USPTO, Non-Final Office Action mailed May 1, 2008; U.S. Appl. No. 11/111,265, filed Apr. 21, 2005.

USPTO, Final Office Action mailed Dec. 29, 2008; U.S. Appl. No. 11/111,265, filed Apr. 21, 2005.

USPTO, Non-Final Office Action mailed Jun. 8, 2009; U.S. Appl. No. 11/111,265, filed Apr. 21, 2005.

USPTO, Non-Final Office Action mailed Jun. 26, 2008; U.S. Appl. No. 11/620,707, filed Jan. 7, 2007.

USPTO, Final Office Action mailed Oct. 21, 2008; U.S. Appl. No. 11/620,707, filed Jan. 7, 2007.

USPTO, Non-Final Office Action mailed Mar. 25, 2009; U.S. Appl. No. 11/620,707, filed Jan. 7, 2007.

USPTO, Non-Final Office Action mailed Aug. 7, 2008; U.S. Appl. No. 11/620,711, filed Jan. 7, 2007.

USPTO, Final Office Action mailed Feb. 9, 2009; U.S. Appl. No. 11/620,711, filed Jan. 7, 2007.

USPTO, Non-Final Office Action mailed Feb. 25, 2009; U.S. Appl. No. 11/683,862, filed Mar. 8, 2007.

USPTO, Non-Final Office Action mailed Dec. 24, 2008; U.S. Appl. No. 11/147,985, filed Jun. 7, 2005.

USPTO, Non-Final Office Action mailed Jun. 25, 2008; U.S. Appl. No. 11/428,254, filed Jun. 30, 2006.

USPTO, Final Office Action mailed Feb. 6, 2009; U.S. Appl. No. 11/428,254, filed Jun. 30, 2006.

USPTO, Non-Final Office Action mailed May 15, 2009; U.S. Appl. No. 11/147,664, filed Jun. 7, 2005.

Sonic Blue "ReplayTV 5000 User's Guide," 2002, entire document.

Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.

Microsoft Corporation; Harman/Kardon "Master Your Universe" 1999.

Matsushita Electric Corporation of America MicroCast: Wireless PC Multimedia Transceiver System, Nov. 1998.

"Wireless Local Area Networks: Issues in Technology and Standards" Jan. 6, 1999.

USPTO, Final Office Action mailed Jun. 25, 2009; U.S. Appl. No. 11/147,985, filed Jun. 7, 2005.

USPTO Non-Final Office Action mailed Aug. 11, 2010; U.S. Appl. No. 11/111,265, filed Apr. 21, 2005.

USPTO Final Office Action mailed Sep. 24, 2010; U.S. Appl. No. 11/620,707, filed Jan. 7, 2007.

USPTO Non-Final Office Action mailed Sep. 30, 2010; U.S. Appl. No. 12/758,193, filed Apr. 12, 2010.

USPTO Non-Final Office Action mailed Sep. 29, 2010; U.S. Appl. No. 12/758,194, filed Apr. 12, 2010.

USPTO Non-Final Office Action mailed Sep. 30, 2010; U.S. Appl. No. 12/758,196, filed Apr. 12, 2010.

USPTO Non-Final Office Action mailed Oct. 4, 2010; U.S. Appl. No. 12/643,812, filed Dec. 21, 2009.

Japan Patent Office "Notice of Grounds for Rejection (Office Action)," mailed May 25, 2010; Patent Application No. 2007-0268269.

Japan Patent Office "Notice of Grounds for Rejection (Office Action)," mailed May 25, 2010; Patent Application No. 2007-527683.

China State Intellectual Property Office "Office Action" issued Mar. 18, 2010 for Application No. 200680022520.6.

China State Intellectual Property Office "Office Action" issued Apr. 13, 2010 for Application No. 200580026825.X.

Canadian Intellectual Property Office "Office Action" mailed Feb. 18, 2010 for Application No. 2569610.
European Patent Office "European Search Report," mailed May 7, 2010 for Application No. 06786174.0.
Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Margulis, Neal "Apparatus and Method for Effectively Implementing a Wireless Television System," U.S. Appl. No. 12/758,196, filed Apr. 12, 2010.
Kirkorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.
USPTO, Final Office Action, mailed Nov. 6, 2009; U.S. Appl. No. 09/809,868, filed Mar. 15, 2001.
USPTO, Final Office Action mailed Nov. 12, 2009; U.S. Appl. No. 11/620,707, filed Jan. 7, 2007.
USPTO, Non-Final Office Action mailed Nov. 23, 2009; U.S. Appl. No. 11/683,862, filed Mar. 8, 2007.
USPTO, Non-Final Office Action mailed Oct. 1, 2009; U.S. Appl. No. 11/778,287, filed Jul. 16, 2007.
USPTO Final Office Action mailed Dec. 30, 2009; U.S. Appl. No. 11/147,664, filed Jun. 7, 2005.
European Patent Office, European Search Report, mailed Sep. 28, 2009 for European Application No. EP 06 78 6175.
International Search Report for PCT/US2008/069914 mailed Dec. 19, 2008.
PCT Partial International Search, PCT/US2009/054893, mailed Dec. 23, 2009.
Newton's Telecom Dictionary, 21st ed., Mar. 2005.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
Srisuresh, P. et al. "Traditional IP Network Address Translator (Traditional NAT)," Network Working Group, The Internet Society, Jan. 2001.
Lucas, Brian et al. "Systems and Methods for Establishing Connections Between Devices Communicating Over a Network," U.S. Appl. No. 12/426,103, filed Apr. 17, 2009.
Thiyagarajan, Venkatesan et al. "Always-On-Top Media Player Launched From a Web Browser," U.S. Appl. No. 12/617,271, filed Nov. 12, 2009.
Paul, John Michael et al. "Systems and Methods for Delivering Messages Over a Network," U.S. Appl. No. 12/619,192, filed Nov. 16, 2009.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server Via a Network," U.S. Appl. No. 12/645,870, filed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
Asnis, Ilya et al. "Mediated Network address Translation Traversal" U.S. Appl. No. 12/405,039, filed Mar. 16, 2009.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
European Patent Office "Extended European Search Report" dated Feb. 28, 2011; Appln. No. 06734554.
Japan Patent Office "Decision of Rejection (Final Rejection)" mailed Mar. 15, 2011; Patent Appln. No. 2007-527683.
China State Intellectual Property Office "Second Office Action" mailed May 18, 2011; Appln. No. 200780030811.4.
USPTO "Non-Final Office Action" mailed Sep. 16, 2011; U.S. Appl. No. 11/111,265, filed Apr. 21, 2005.
USPTO "Notice of Allowance" mailed Sep. 22, 2011; U.S. Appl. No. 12/979,145, filed Dec. 27, 2010.
Australian Government "Notice of Acceptance" mailed Aug. 10, 2011; Patent Appln. No. 2006240518.
Japan Patent Office "Notice of Grounds for Rejection (Office Action)" mailed Jun. 28, 2011; Japanese Patent Appln. No. P2008-507651.
USPTO "Non-Final Office Action" mailed Sep. 6, 2011; U.S. Appl. No. 12/347,465, filed Dec. 31, 2008.

* cited by examiner

SYSTEMS AND METHODS FOR CONTROLLING THE ENCODING OF A MEDIA STREAM

PRIORITY CLAIM

This application is a continuation in part of U.S. patent application Ser. No. 11/147,663 entitled "Personal media broadcasting system with output buffer" filed on Jun. 7, 2005, which claims the benefit of U.S. Provisional Application No. 60/577,833, filed Jun. 7, 2004. Both of these applications are incorporated by reference in their entirety.

TECHNICAL FIELD

The present disclosure generally relates to techniques for controlling the encoding of a bitstream, such as a media stream, that is transmitted over a data connection.

BACKGROUND

Recently, consumers have expressed significant interest in "place shifting" devices that allow viewing of television or other media content at locations other than their primary television set. Place shifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network.

While placeshifting does greatly improve the convenience afforded to the viewer, challenges can arise in effectively creating and transmitting the encoded media stream. The variety of network environments (e.g., LAN, WAN, Internet, wireless telephone, etc.) that may be supported can lead to significant variations in encoding parameters over time. Moreover, digital networks, particularly those based on Ethernet and/or TCP/IP-type protocols, are inherently unpredictable, which can lead to difficulties in selecting particular encoding parameters to be used in creating and transmitting the media stream over any particular network. Moreover, network conditions can change very rapidly, thereby leading to difficulties in maintaining encoding parameters that are both efficient and current.

It is therefore desirable to create systems and methods for controlling the encoding of a media stream that is transmitted over a network or other data connection. These and other desirable features and characteristics will become apparent from the subsequent detailed description and the appended claims, taken in conjunction with the accompanying drawings and this background section.

BRIEF SUMMARY

According to various exemplary embodiments, systems and methods are described for providing a media stream transmitted from an encoding system to a remotely-located media player. In an exemplary method, the media stream is encoded according to an encoding parameter. Data is gathered about a transmit buffer within the encoding system, and the gathered data is processed to determine an estimate of network capacity and a calculated encoder rate. The encoding parameter is adjusted during subsequent encoding as a function of in at least one of the estimate of network capacity and the calculated encoder rate.

In other embodiments, a media encoding system is provided for providing a media stream to a remote player over a network. The media encoding system comprises a media encoding module configured to receiving an input signal and to encode the media stream according to an encoding parameter, a network interface configured to transmit the encoded media stream to the remote player over the network, a transmit buffer configured to be filled by the media encoding module and emptied by the network interface; and a control module. The control module is configured to gather data about the transmit buffer, to process the gathered data to determine an estimate of a network capacity and a calculated encoder rate, and to adjust the encoding parameter during subsequent encoding as a function of at least one of the estimate of network capacity and the calculated encoder rate.

Various embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, the efficiency and effectiveness of media stream encoding can be greatly improved by considering the particular values of the current encoder rate and the capacity of a transmit buffer located between the encoder and the network, as described more fully below. The buffer's occupancy behavior can be a relatively good indicator of actual network capacity and behavior. As a result, by considering the actual rate at which the media stream is being created with respect to the actual rate that the stream is being transmitted on a network, system behavior can be significantly improved in comparison to conventional techniques.

In particular, at least two issues can arise during the encoding and transmission process. First, if the data encoder has a wider range of operation above and below the capacity of the data connection, a bottleneck in system throughput can occur if the encoder provides data at a faster or slower rate than the network transmission rate. If the encoder operates at a faster rate than the network transmission rate, then the buffer between the encoder and the network will fill until it reaches its capacity. Conversely, if the encoder operates slower than the network transmission rate, then the capability of the network becomes underutilized.

Secondly, issues can occur in assigning processing resources between the encoder module and the network processing module within the device that can lead to sub-optimal performance. For example, if the encoder consumes an unduly large amount of processor time to produce the media stream, the remaining processor time may be insufficient for the network module to transmit the data, thereby resulting in loss of data and/or a degraded user experience. Similarly, if the encoder generates data at a less-than-optimal rate, the quality of the encoded signal can also be less than optimal, thereby reducing the demands placed upon the network transmission module. In this case, the processor is under-utilized, thereby again leading to a degraded user experience. Hence, it is desirable in many implementations to balance the processor allocation between the encoder and the network modules in a manner that allows both the encoder and network processing modules to operate at a capacity that provides the best possible user experience.

By addressing the actual rates by which the transmit buffer is filled and emptied, much more precise control over the encoding and transmitting processes can be achieved, resulting in better resource allocation and/or more efficient resource utilization. Various embodiments may address either or both of these issues, and/or may provide other features as desired.

Figure 1:
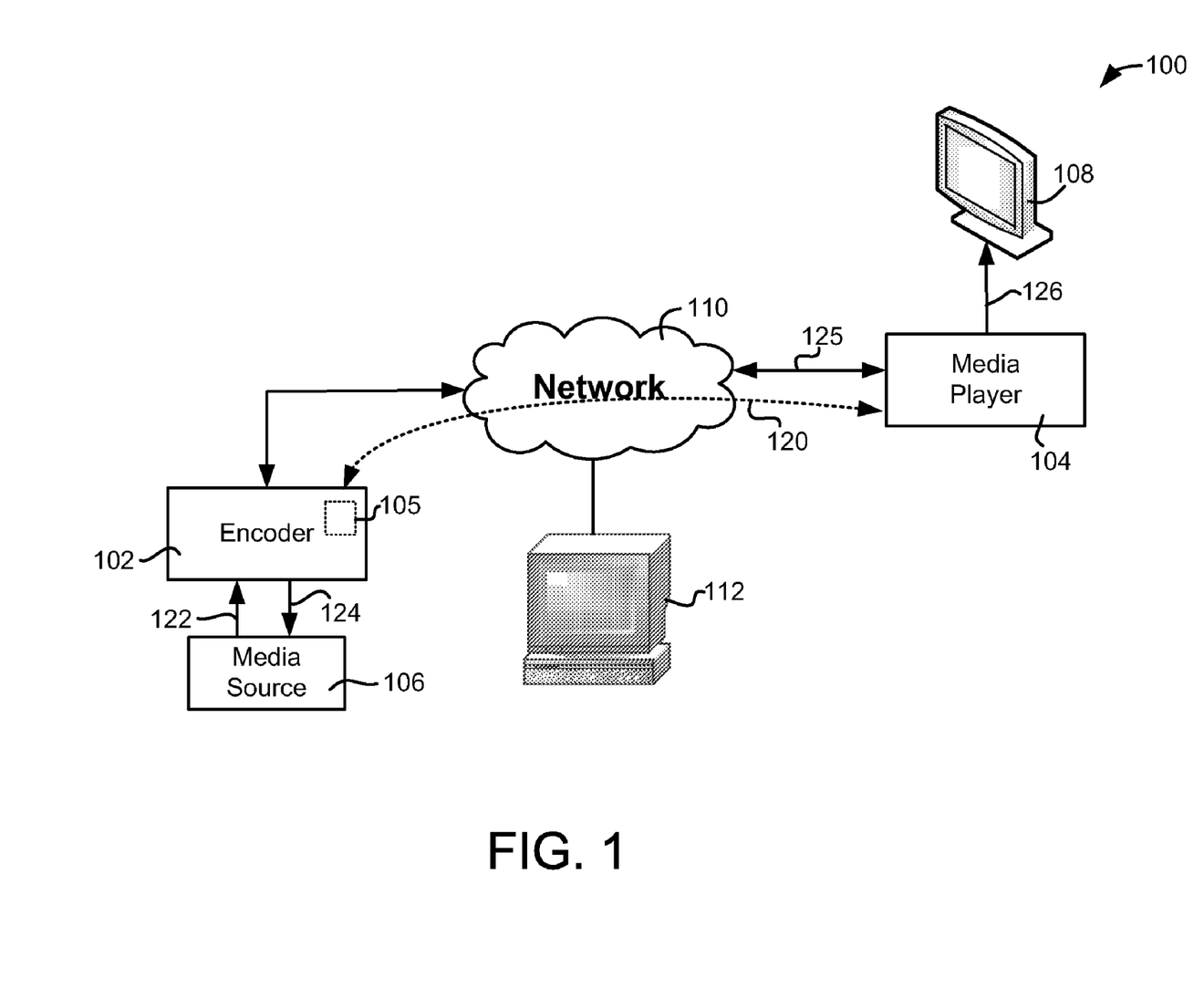
FIG. 1 is a block diagram of an exemplary media encoding system.

Turning now to the drawing figures and with initial reference to FIG. 1, an exemplary placeshifting system 100 suitably includes a placeshifting encoder system 102 that receives media content 122 from a content source 106, encodes the received content into a streaming format, and then transmits the encoded media stream 120 to a media player 104 over network 110. The media player 104 suitably receives the encoded stream 120, decodes the stream, and presents the decoded content to a viewer on a television or other display 108. In various embodiments, a server 112 may also be provided to communicate with encoder system 102 and/or player 104 via network 110 to assist these devices in locating each other, maintaining security, providing or receiving content or information, and/or any other features as desired. This feature is not required in all embodiments, however, and the concepts described herein may be deployed in any data streaming application or environment, including placeshifting but also any other media or other data streaming situation.

Placeshifting encoder system 102 is any component, hardware, software logic and/or the like capable of transmitting a packetized stream of media content over network 110. In various embodiments, placeshifting device 102 incorporates suitable encoder and/or transcoder (collectively "encoder") logic to convert audio/video or other media data 122 into a packetized format that can be transmitted over network 110. The media data 122 may be received in any format, and may be received from any internal or external source 106 such as any sort of broadcast, cable or satellite television programming source, a "video-on-demand" or similar source, a digital video disk (DVD) or other removable media, a video camera, and/or the like. Encoder system 102 encodes media data 122 to create media stream 120 in any manner. In various embodiments, encoder system 102 contains a transmit buffer 105 that temporarily stores encoded data prior to transmission on network 110. As buffer 105 fills or empties, one or more parameters of the encoding (e.g., the bit rate of media stream 120) may be adjusted to maintain desirable picture quality and data throughput in view of the then-current network performance.

As described more fully below, various embodiments are able to calculate a current encoding rate and a current network transfer rate, and are able to adjust the encoding rate as the network transfer rate changes. Changes in the network transfer rate may be identified from, for example, changes in the utilization of the outgoing buffer 105.

Several examples of encoding systems 102 may be implemented using any of the various SLINGBOX products available from Sling Media of Foster City, Calif., although other products could be used in other embodiments. Many different types of encoder systems 102 are generally capable of receiving media content 122 from an external source 106 such as any sort of digital video recorder (DVR), set top box (STB), cable or satellite programming source, DVD player, and/or the like. In such embodiments, encoder system 102 may additionally provide commands 124 to the source 106 to produce desired signals 122. Such commands 124 may be provided over any sort of wired or wireless interface, such as an infrared or other wireless transmitter that emulates remote control commands receivable by the source 106. Other embodiments, however, particularly those that do not involve placeshifting, may modify or omit this feature entirely.

In other embodiments, encoder system 102 may be integrated with any sort of content receiving or other capabilities typically affiliated with source 106. Encoder system 102 may be a hybrid STB or other receiver, for example, that also provides transcoding and placeshifting features. Such a device may receive satellite, cable, broadcast and/or other signals that encode television programming or other content received from an antenna, modem, server and/or other source. The receiver may further demodulate or otherwise decode the received signals to extract programming that can be locally viewed and/or place shifted to a remote player 104 as appropriate. Such devices 102 may also include a content database stored on a hard disk drive, memory, or other storage medium to support a personal or digital video recorder (DVR) feature or other content library as appropriate. Hence, in some embodiments, source 106 and encoder system 102 may be physically and/or logically contained within a common component, housing or chassis.

In still other embodiments, encoder system 102 is a software program, applet or the like executing on a conventional computing system (e.g., a personal computer). In such embodiments, encoder system 102 may encode, for example, some or all of a screen display typically provided to a user of the computing system for placeshifting to a remote location. One device capable of providing such functionality is the SlingProjector product available from Sling Media of Foster City, Calif., which executes on a conventional personal computer, although other products could be used as well.

Media player 104 is any device, component, module, hardware, software and/or the like capable of receiving a media stream 120 from one or more encoder systems 102. In various embodiments, remote player 104 is personal computer (e.g., a "laptop" or similarly portable computer, although desktop-type computers could also be used), a mobile phone, a personal digital assistant, a personal media player (such as the ARCHOS products available from the Archos company of Igny, France) or the like. In many embodiments, remote player 104 is a general purpose computing device that includes a media player application in software or firmware that is capable of securely connecting to placeshifting encoder system 102, as described more fully below, and of receiving and presenting media content to the user of the device as appropriate. In other embodiments, however, media player 104 is a standalone or other separate hardware device capable of receiving the media stream 120 via any portion of network 110 and decoding the media stream 120 to provide an output signal 126 that is presented on a television or other display 108. One example of a standalone media receiver 104 is the SLINGCATCHER product available from Sling Media of Foster City, Calif., although other products could be equivalently used.

Network 110 is any digital or other communications network capable of transmitting messages between senders (e.g., encoder system 102) and receivers (e.g., receiver 104). In various embodiments, network 110 includes any number of public or private data connections, links or networks supporting any number of communications protocols. Network 110 may include the Internet, for example, or any other network based upon TCP/IP or other conventional protocols. In various embodiments, network 110 also incorporates a wireless and/or wired telephone network, such as a cellular communications network for communicating with mobile phones, personal digital assistants, and/or the like. Network 110 may also incorporate any sort of wireless or wired local area networks, such as one or more IEEE 802.3 and/or IEEE 802.11 networks.

Encoder system 102 and/or player 104 are therefore able to communicate with player 104 in any manner (e.g., using any sort of data connections 128 and/or 125, respectively). Such communication may take place over a wide area link that includes the Internet and/or a telephone network, for example; in other embodiments, communications between devices 102 and 104 may take place over one or more wired or wireless local area links that are conceptually incorporated within network 110. In various equivalent embodiments, encoder system 102 and receiver 104 may be directly connected via any sort of cable (e.g., an Ethernet cable or the like) with little or no other network functionality provided.

Many different placeshifting scenarios could be formulated based upon available computing and communications resources, consumer demand and/or any other factors. In various embodiments, consumers may wish to placeshift content within a home, office or other structure, such as from a placeshifting encoder system 102 to a desktop or portable computer located in another room. In such embodiments, the content stream will typically be provided over a wired or wireless local area network operating within the structure. In other embodiments, consumers may wish to placeshift content over a broadband or similar network connection from a primary location to a computer or other remote player 104 located in a second home, office, hotel or other remote location. In still other embodiments, consumers may wish to placeshift content to a mobile phone, personal digital assistant, media player, video game player, automotive or other vehicle media player, and/or other device via a mobile link (e.g., a GSM/EDGE or CDMA/EVDO connection, any sort of 3G or subsequent telephone link, an IEEE 802.11 "Wi-fi" link, and/or the like). Several examples of placeshifting applications available for various platforms are provided by Sling Media of Foster City, Calif., although the concepts described herein could be used in conjunction with products and services available from any source.

Encoder system 102, then, generally creates a media stream 120 that is routable on network 110 based upon content 122 received from media source 106. To that end, and with reference now to FIG. 2, encoder system 102 typically includes an encoder module 202, a buffer 105 and a network interface 206 in conjunction with appropriate control logic 205. In operation, encoder module 202 typically receives media content 122 from an internal or external source 106, encodes the data into the desired format for media stream 120, and stores the encoded data in buffer 105. Network interface 206 then retrieves the formatted data from buffer 105 for transmission on network 110. Control module 205 suitably monitors and controls the encoding and network transmit processes carried out by encoding module 202 and network interface 206, respectively, and may perform other features as well. Encoder system 102 may also have a module 208 or other feature capable of generating and providing commands 124 to an external media source 106, as described above.

Figure 2:
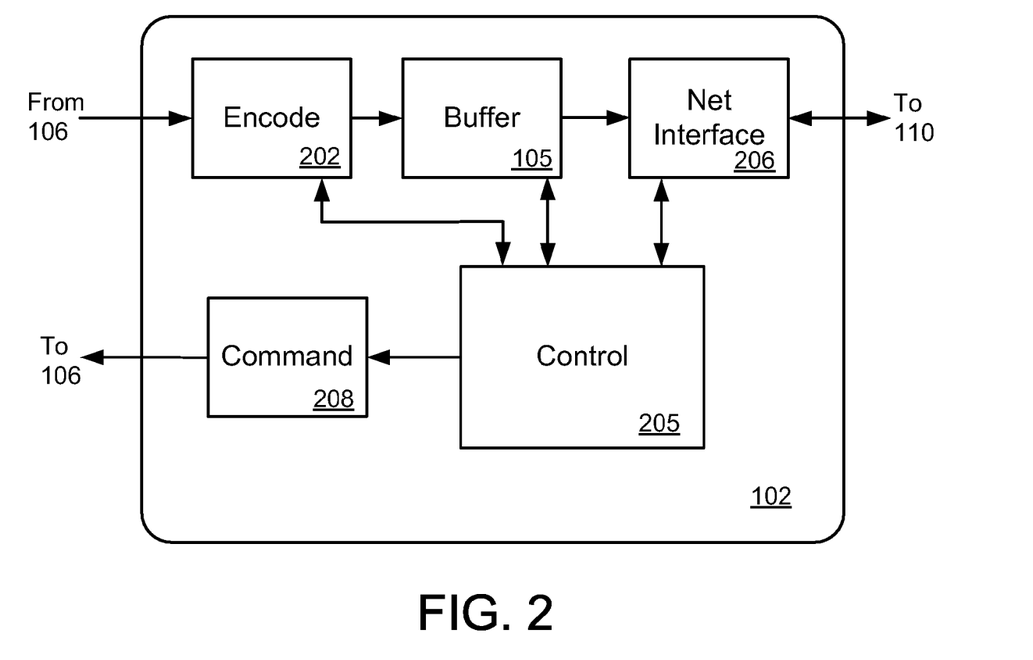
FIG. 2 is a block diagram of an exemplary media encoding device.

In the exemplary embodiment shown in FIG. 2, modules 202, 105, 205, 206 and 208 may be implemented in software or firmware residing in any memory, mass storage or other storage medium within encoder system 102 in source code, object code and/or any other format. Such features may be executed on any sort of processor or microcontroller executing within encoder system 102. In various embodiments, encoder system 102 is implemented as a system on a chip (SoC) type system with integrated processing, storage and input/output features. Various SoC hardware implementations are available from Texas Instruments, Conexant Systems, Broadcom Inc., and other suppliers as appropriate. Other embodiments may use any number of discrete and/or integrated processing components, memories, input/output features and/or other features as desired.

As noted above, creating a media stream 120 typically involves encoding and/or transcoding an input media stream 122 received from an internal or external media source 106 into a suitable digital format that can be transmitted on network 110. Generally, the media stream 120 is placed into a standard or other known format (e.g., the WINDOWS MEDIA format available from the Microsoft Corporation of Redmond, Wash. although other formats such as the QUICKTIME format, REALPLAYER format, MPEG format, and/or the like could be used in any other embodiments) that can be transmitted on network 110. This encoding may take place, for example, in any sort of encoding module 202 as appropriate. Encoding module 202 may be any sort of hardware (e.g., a digital signal processor or other integrated circuit used for media encoding), software (e.g., software or firmware programming used for media encoding that executes on the SoC or other processor described above), or the like. Encoding module 202 is therefore any feature that receives media data 122 from the internal or external source 106 (e.g., via any sort of hardware and/or software interface) and encodes or transcodes the received data into the desired format for transmission on network 110. Although FIG. 2 shows a single encoding module 202, in practice system 102 may include any number of encoding modules 202. Different encoding modules 202 may be selected based upon preference of player 104, network conditions, and/or the like.

In various embodiments, encoder 202 may also apply other modifications, transforms and/or filters to the received content before or during the transcoding process. Video signals, for example, may be resized, cropped and/or skewed. Similarly, the color, hue and/or saturation of the signal may be altered, and/or noise reduction or other filtering may be applied. Audio signals may be modified by adjusting volume, sampling rate, mono/stereo parameters, noise reduction, multi-channel sound parameters and/or the like. Digital rights management encoding and/or decoding may also be applied in some embodiments, and/or other features may be applied as desired.

As noted above, one or more parameters of the encoding process (e.g., the bit rate, frame rate, image resolution and/or other parameters) may be adjusted during the encoding process to produce a media stream 120 that is modified or tuned to the then-current capabilities of network 110. The encoding bit rate, for example, can be adjusted in response to a measured capability of network 110. That is, bit rate may be increased when network conditions are able to accommodate the larger bandwidth consumption associated with the higher rate; conversely, bit rate can be decreased when network conditions are less able to accommodate the greater demands. By adjusting the bit rate of the encoding process in response to the network performance, the user experience can be greatly improved.

Network interface 206 refers to any hardware, software and/or firmware that allows encoding system 102 to communicate on network ii. In various embodiments, network interface 206 includes suitable network stack programming and other features and/or conventional network interface (NIC) hardware such as any wired or wireless interface as desired.

In various embodiments, control module 205 monitors and controls the encoding and transmit processes performed by encoding module 202 and network interface 206, respectively. To that end, control module 205 is any hardware, software, firmware or combination thereof capable of performing such features. In various embodiments, control module 205 further processes commands received from the remote player via network interface 206 (e.g., by sending commands 124 to the media source 106 via a command module 208 or the like). Control module 205 may also transmit commands to the remote player 104 via network interface 206 and/or may control or otherwise effect any other operations of the encoder system 102. In various embodiments, control module 205 implements the control features used to monitor and adjust the operation of encoder 202 and/or network interface 106 to efficiently provide the media stream to remote player 104.

One technique for monitoring the capability of network 110 involves monitoring the fullness and/or utilization of a buffer 105 in the encoder system 102 as well as the rates at which the buffer 105 fills and empties. Buffer 105 is typically any sort of hardware and/or software feature capable of temporarily storing encoded data prior to transmission on network 110. Typically, buffer 105 is implemented in a portion of memory or mass storage associated with encoder 101. If buffer 105 remains relatively empty, then the data transmit rate can be deduced to be relatively well-matched to the data encoding rate. That is, data is being transmitted at approximately the same rate that it is being encoded. If the buffer 105 is filling, however, this indicates that the encoder is generating data faster than the network 110 can transmit the data.

Figure 3:
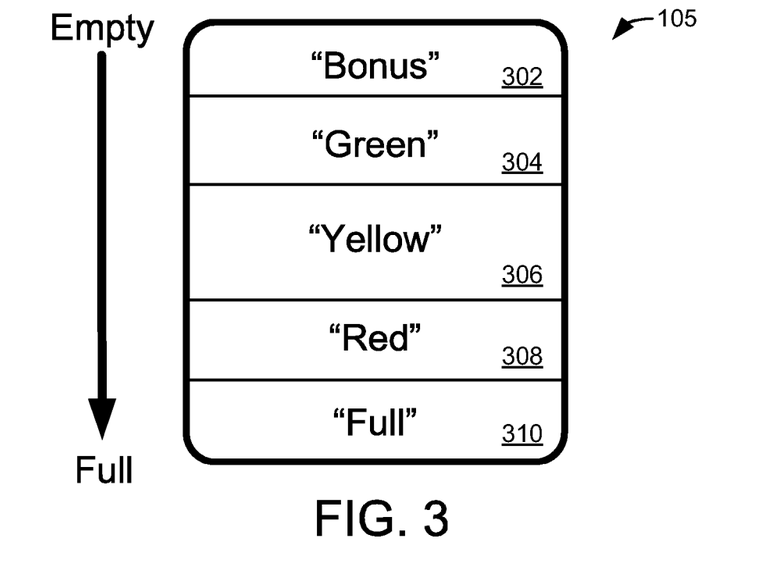
FIG. 3 is a diagram of an exemplary category/watermark structure that may be useful in describing certain buffer conditions.

FIG. 3 shows one example of a category/watermark structure that may be useful in describing certain conditions of buffer 105. In the exemplary embodiment of FIG. 3, the top of buffer 105 represents an empty state with little or no buffered data present, and the bottom of buffer 105 represents a full state with relatively little or no space available for buffering additional data. As noted in FIG. 3, the amount of available space in buffer 105 may be represented by various exemplary states 302 ("Bonus"), 304 ("Green"), 306 ("Yellow"), 308 ("Red") and 310 ("Full"). Other embodiments may use any number of states having different relative sizes, descriptors or other features. In the example of FIG. 3, a "Bonus" state 302 may be considered to be a state of relative buffer emptiness (e.g., less than about 15% or so) when relatively aggressive parameters may be used. The "Green" state 304 may represent some data in buffer 105 (e.g., about 15-30% or so), but with a substantial portion of the buffer remaining available for use. "Yellow" state 306 may represent somewhat more filling of buffer 105 (e.g., about 30-70% or so), with the "Red" state representing a condition of relative buffer fullness (e.g., about 70-85% or so). The "full" state may represent conditions wherein the buffer is simply flushed (e.g., data is discarded) to avoid overflow. This condition may create gaps in the content stream presented to the viewer, however. As noted above, other embodiments may use any number of widely-varying states 302-310 to describe buffer 105, with any state or combination of states having any size, upper or lower boundary, or other parameters as desired.

In a conventional environment, the boundaries between various states 302-310 may represent "watermarks" that indicate transition points wherein the bit rate (or other encoding parameter) is adjusted upwardly and/or downwardly. As the buffer utilization moves from the "yellow" state 306 to the "green" state 304, for example, bit rate may be increased to take advantage of the excess capacity. Similarly, bit rate may be decreased as the buffer utilization breaches a watermark from the top (as shown in FIG. 3) toward the bottom of the figure.

In various embodiments, this broad concept of watermarks can be expanded to even further improve performance. Rather than limiting parameter changes to occurrences of watermark breaches, for example, adjustments may be made within categories (or otherwise) based upon the actual measured/observed values of the encoder rate and buffer capacity. For example, the encoder rate (or other appropriate parameter) may be adjusted based upon a specific amount that is tailored to the actual buffer conditions rather than simply adjusting in accordance with a pre-determined amount that was empirically or otherwise determined at a different time. Further, different actions may be taken at different levels of operation. More aggressive encoding (e.g., increasing encoding bitrate), for example, can be performed at the higher levels (e.g., "bonus" level 302 or "green" level 304) in comparison to the lower levels. Hence, it may be possible and desirable to increase the bitrate (for example) during "green" operation even if a watermark has not been crossed. Similarly, it may be desirable to maintain the bitrate (or other parameter) at a lower level during "red" or "yellow" operation, even following a watermark transition, to let the buffer empty somewhat before making more aggressive parameter changes. Rather than simply adjusting bitrate or other parameters upwardly or downwardly in response to watermark transitions, then, more advanced processing can be used to obtain better performance and/or better asset utilization. Additional details of an exemplary implementation are set forth below.

Some embodiments may further retain the use of watermark structures (such as the structure 300 shown in FIG. 3) for convenience, backward compatibility, compensation for measurement, computation or other tolerances, and/or the like. In various embodiments, the particular levels represented by one or more watermarks may be adjusted upwardly or downwardly during operation as desired to reflect the current state of encoding and transmission. Generally, the watermarks can be varied as a function of any known and measurable parameters such as network capacity, encoder bitrate, video width & height, and/or other factors as appropriate.

Figure 4:
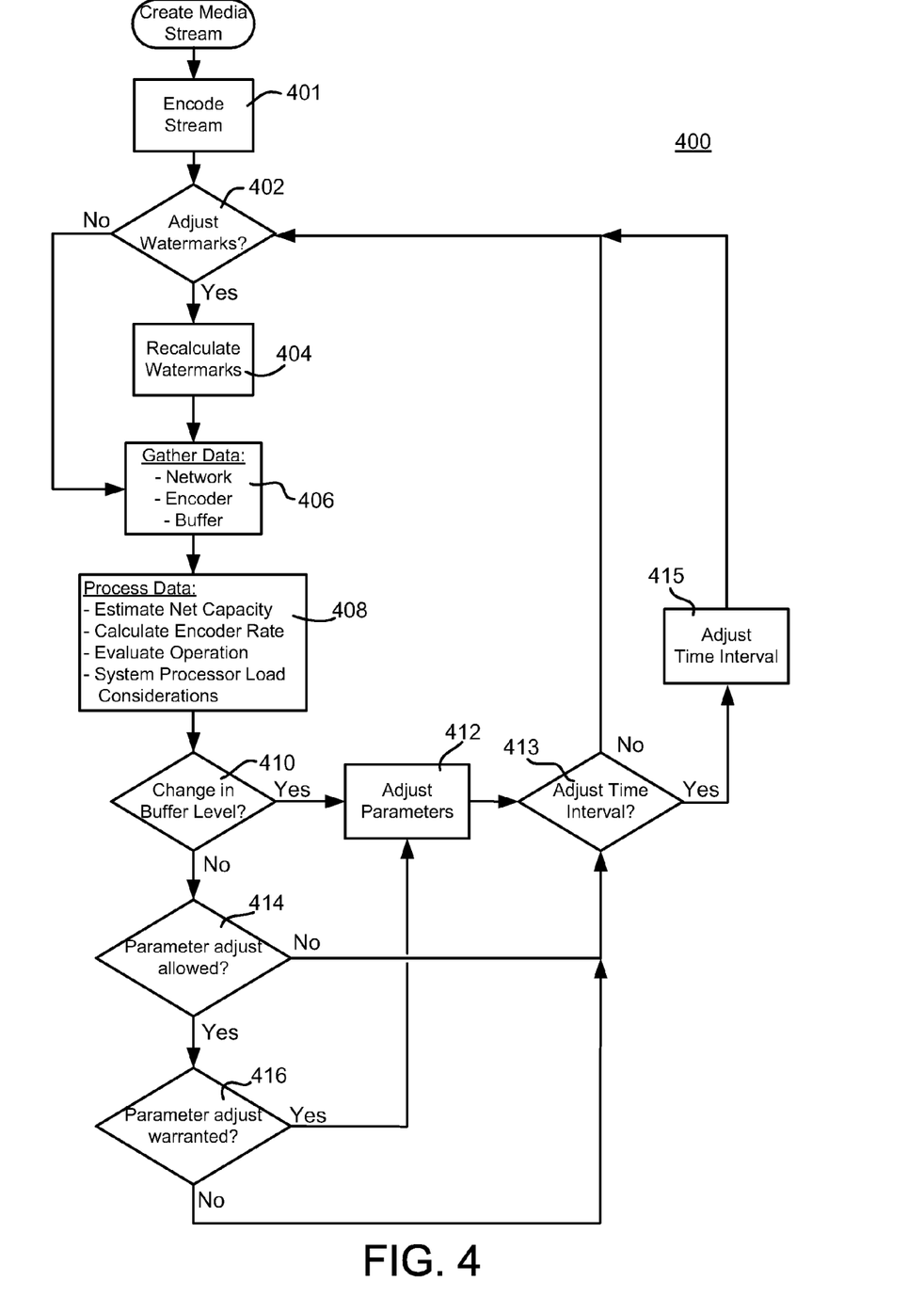
FIG. 4 is a flowchart of an exemplary process for controlling the encoding of a media stream.

Turning now to FIG. 4, an exemplary method 400 for controlling the encoding of a media stream 120 suitably includes the broad steps of gathering data (step 406), processing the gathered data (step 408), adjusting one or more encoding parameters (steps 412, 415) at appropriate times (steps 410, 414, 416), and adjusting any watermarks at appropriate times (steps 402, 404). Generally speaking, the various steps of method 400 may be carried out with any sort of hardware, software and/or firmware logic within encoder system 102. Method 400 may be carried out, for example, by control logic 205 (FIG. 2) operating in conjunction with encoder logic 202, buffer 105 and network interface 206 as appropriate. In various embodiments, the various steps of method 400 are carried out in response to software or firmware instructions stored in a memory, or on a disk drive and/or other storage associated with encoder system 102. Such instructions may be executed by any processor and/or other processing features within encoder system 102 or the like. The particular means used to implement each of the various functions shown in FIG. 4, then, could be any sort of processing hardware (such as controller 205 of FIG. 2) executing conventional software logic in any format.

Generally speaking, watermarks may be adjusted on any regular or irregular basis (step 402). In various embodiments, watermarks are recalculated (step 404) on any regular temporal basis (e.g., every second or so), any irregular logical basis (e.g., every n-th iteration of method 400, such as every tenth iteration or so), or on any other basis as desired. In an exemplary embodiment, method 400 repeats at a frequency of about every 100 ms or so (other embodiments may vary), with watermarks being recalculated on every tenth iteration or so, thereby resulting in recalculation about every second. Other embodiments may use other parameters, and/or may consider other factors as desired. For example, watermarks may be recalculated in some embodiments when it is known that the encoding parameter has been adjusted; conversely, some embodiments may omit recalculation when it is known that the encoding parameter has not been adjusted since the last recalculation. Other embodiments may supplement or modify step 402 in any manner.

Watermarks are calculated according to any suitable parameters, constraints or techniques (step 404). Generally speaking, the watermarks are calculated based upon the then-current value of the adjusted parameter (e.g., bit rate). In various embodiments, an average (or weighted average) of current and former parameter values may be used in determining the new watermarks, as appropriate. The amount of historical data used in creating the average can be determined in any manner, and historical data may be weighted as desired (e.g., so that older data is given less weight).

Data is gathered on any appropriate basis (step 406). In various embodiments, data is gathered on a relatively regular temporal basis (e.g., every 100 ms or so), although other embodiments may gather data on a more irregular or other basis. Data gathered in step 406 is any information that allows for the computation of network capacity, encoder bitrate and/or other factors as appropriate. In various embodiments, data is gathered relating to amount of network traffic (e.g., number of bytes) transferred since the last iteration of step 406, the amount of encoded data (e.g., in bytes) generated since the last iteration of step 406, and/or the current buffer occupancy level (e.g., expressed in bytes or as a percentage of the total buffer capacity). Other factors or parameters may be collected in any number of alternate embodiments.

The gathered data is then processed to arrive at an estimate of network capacity and a calculated encoder rate (step 408). In various embodiments, the values gathered in step 406 may be averaged over any appropriate period of time (e.g., a second or so) to reduce the effects of relatively short term transients that may occur. Network capacity may be calculated based upon the average amount of network traffic transferred over some appropriate period of recent time (e.g., a second or so), for example. The encoder rate may be similarly calculated based upon actual and/or average saved encoder rates over a relevant period of time (e.g., a second or so). Hence, by tracking the rates by which the buffer 105 is filled (e.g., the encoder rate) and emptied (e.g., the network transmit rate), any discrepancies between the two can be readily identified. Similarly, average buffer occupancy over a relatively recent period of time can be used to estimate the current zone of operation. In various embodiments, the zone of operation may be adjusted based upon an average of fewer samples (e.g., representing a shorter period of time, such as about 0.5 sec or so) than the average time window used for the other calculations performed. The averages used to compute the various values may change with each iteration of method 400 so that the averages are effectively "sliding" averages, as appropriate. System processor load may also be considered in any manner. In various embodiments, processor over and/or under utilization can be tracked and compensated in any manner.

Changes in the encoding parameter (e.g., bit rate) may be made in any manner (steps 410 and 412). In various embodiments, the encoding parameter is evaluated upon each iteration of method 400 (e.g., on the order of every 100 ms or so) according to various criteria. In the exemplary embodiment shown in FIG. 4, the encoding parameter is adjusted when change occurs in the buffer utilization (step 410). As the buffer utilization increases or decreases to a new state 302-310 (FIG. 3), for example, the rate can be adjusted to reflect the newer state. Note that in various embodiments, the particular state boundaries or watermarks used may vary from iteration to iteration of method 400 due to recalculations in step 404. Further, in some embodiments, only certain changes in buffer utilization will trigger changes to the encoding parameter. As noted above, the encoding parameter may not be adjusted when, for example, operation traverses the state boundary separating "red" from "yellow" (and/or "yellow" from "green") operation to prevent over-filling of buffer 105, to allow buffer 105 to empty, and/or for any other reason. Other rules may be applied as desired so that parameter adjustments are not necessarily performed in response to all state transitions. Further, adjustments may be performed even when no state transition has occurred. Adjustments may be appropriate to "fine tune" operation within an operating state, for example, or adjustments may be made based solely on the relative buffer fill and empty rates and/or the overall buffer utilization value, without regard to whether a particular watermark has been breached or other state transition has occurred.

If a parameter adjust is warranted, the particular encoding parameter may be adjusted upwardly or downwardly as desired (step 412). Encoding bit rate, for example, may be increased or decreased to reflect increased or decreased network capability, for example. The particular amount of change will depend upon the particular embodiment and various other factors. For example, bit rate changes may increase more aggressively when the buffer 105 is relatively empty, since buffer space is available to compensate for any over-aggressiveness. Conversely, rate increases may be applied much more conservatively when buffer 105 is relatively full. Other factors may be considered as appropriate.

In many embodiments, it may be undesirable to make too frequent changes to the encoding parameter. Maintaining at least some time interval between parameter changes can allow effective buffer utilization, and can reduce any transient effects of short-lived changes in network capacity and/or processor load, thereby improving the user experience. This delay in time changes is reflected in a "time interval" parameter in FIG. 4 that can be adjusted as desired (steps 413 and 415). It may be beneficial, for example, to prevent subsequent parameter changes for a second or so after any change so that the effects of the change can be more carefully considered. Again, the amount of delay between changes may be less when the buffer is relatively empty, since additional margin for error exists. Similarly, the amount of delay following a decrease in bit rate (or a similar parameter) may be less than the delay following an increase. In various embodiments, the time interval parameter set in step 415 may be considered at a later point (e.g., step 414) to determine if adjustments to the bit rate (or other encoding parameter) are allowed.

In addition to allowing changes in the encoding parameter in response to breaching of a watermark in step 410, various embodiments further adjust the encoding parameters when conditions otherwise warrant (step 416). Adjustments may include any changes to the bit rate, frame rate, image resolution, audio or video quality, or any other parameters or features as desired. For example, the encoding parameter may be adjusted to match the network capacity calculations made in step 408. If the network rate is significantly greater or less than the encoding rate, for example, the encoding rate can be adjusted to match the network capability even if buffer utilization does not indicate a zone transition/watermark breach.

By adjusting the encoding parameters (e.g., the encoding bit rate) in response to the actual fill and empty rates of buffer 105, the performance of encoding system 102 can be substantially improved. By measuring and manipulating the fill and/or empty rates of buffer 105, (e.g., to adapt the fill and empty rates to each other as closely as possible) the user experience can be significantly improved. Moreover, by considering processor utilization in adjusting the encoding parameters, the processor can be more effectively utilized, thereby preventing issues that can result from imbalance.

The particular techniques used to adjust one or more encoding parameters can vary significantly from embodiment to embodiment using the general concepts set forth herein. One detailed implementation is presented below that is intended as one example of the sorts of features that could be implemented in an exemplary encoding system or technique. The various parameters and values used in this example, however, are strictly for purposes of illustration, and are not intended as being exclusive or otherwise limiting.

With reference again to FIG. 3, a transition into bonus zone 302 may be made based upon any suitable conditions. In one embodiment, bonus zone 302 is entered from any other zone if the estimated network rate ("NET") is significantly greater (e.g., more than 25% greater) than the either the set rate of the encoder ("SET") and/or the calculated encoder output rate ("ASF"). In many embodiments, the actual calculated encoder rate may be expected to be within about 10% or so of the set value. The network rate can be expected to significantly exceed the set or actual encoder rates when, for example, the network performance deteriorated in the recent past but has now recovered. In such cases, aggressive correction would be suitable, so the encoder rate may be set to a substantial portion (e.g., 80% or so) of the network rate. This new encoder rate, however, may be limited by peak network values from the recent past. The encoder rate may be limited, for example, to not exceed the average or peak network rate of some appropriate period of time (e.g., 500-1000 ms or so) or some number (e.g., five or so) of the previous values observed. Because this particular adjustment responds to very positive network performance, in some embodiments the bonus transition may be performed even if little or no delay has occurred since a previous adjustment.

Parameter transitions may also occur within zones. Within bonus zone 302, for example, the encoding rate may be increased as network performance increases (e.g., to a maximum of 80% or so of the network rate, which may be constrained by the average or peak values observed in recent past network performance as described above). Such adjustments may be limited to appropriate time intervals, such as every two seconds or so as desired. Although 80% or so is an exemplary value for this particular illustration that is not intended to be limiting on all embodiments, that general value has been identified in practice as providing a particularly beneficial result in that it allows a relatively high utilization of available network resources during "bonus" or similar conditions while still providing a comfortable margin for subsequent degradation in network performance. "About 80%" as used herein generally encompasses a range of about 70-90% or so, although 75-85% or even 78-82% could be used in other embodiments, depending upon the particular levels of precision and tolerance desired for the particular application and setting.

The encoding parameter may also be increased based upon the occupancy of buffer 105, as desired. Within the "bonus" zone 302, for example, the encoder set value may be increased by five percent or so if the buffer empties, and increased more aggressively (e.g., by ten percent or so) if the buffer remains empty for an appropriate period of time (e.g., 500 ms or so). These adjustments may be constrained in time as desired: the smaller adjustment may only occur after the prior rate has been in place for some period of time (e.g., five seconds or so), whereas the more aggressive adjustment may occur after the rate has been steady for a shorter period (e.g., two seconds or so) since the buffer occupancy is observed over a period of time prior to the more aggressive adjustment in this example.

Other upward adjustments of the encoding parameter may be performed in any manner. In an exemplary embodiment, however, the encoding parameter is only adjusted upwardly in response to the buffer achieving a "bonus" level of performance (e.g., the network rate exceeding the configured and/or actual encoder rates by a significant margin) for conservative operation. Upward transitions between non-bonus performance zones, however, may be allowed in other embodiments as desired.

Downward adjustments may also occur in any manner. If the occupancy of buffer 105 during "bonus" operation suddenly increases (e.g., touches "red" zone 308 in FIG. 3, corresponding to about 70-85% or so full), for example, it may be desirable to decrease the encoding rate. Decreasing the set encoder rate to, for example, about 70% of the network and/or the currently set encoder rate (or the lesser of the network and encoder rates) may be appropriate; this transition may occur even if little or no delay had occurred since the prior adjustment. This downward adjustment could be conceptualized as being somewhat similar to decreasing the performance from the "bonus" level to the "green" level, although the actual transition would be based upon actual encoding and network rates rather than simply being based upon zone transitions.

Other downward transitions could occur in other levels of performance as desired. If the system is currently operating in the "green" zone 304, for example, yet buffer occupancy increases dramatically (e.g., to the "red" zone 308, or about 70-85% full), then the encoding rate may be reduced to about eighty percent (or so) of the network and/or set rates (or the lesser of the network and set rates) as desired. This transition may occur after a second (or so) of time has elapsed since the prior adjustment in some embodiments. Other embodiments may additionally (or alternately) constrain the new encoder rate to prevent changes greater than an appropriate percentage (e.g., 50% or so) of the prior encoding rate when the buffer 105 becomes nearly full. That is, if a significant sway in the network rate imposes a significant downgrade, it may be desirable to respond to such situations without creating suddenly large shifts in the encoding rate. Such adjustments may be performed even if little or no delay has occurred after the prior adjustment (although some delay (e.g., 500 ms or so)

may be imposed when the encoder rate is already relatively low to prevent excessive degradation to very low encoder rates).

In some embodiments, it may be desirable to prevent degradation during periods of slight transition. If the actual encoder rate is significantly greater (e.g., ten percent or so greater) than the set rate, it may be desirable to simply do nothing (i.e., maintain the current encoder rate) for a period of time, provided that the buffer 105 is not overly full and other conditions otherwise warrant. If the system temporarily degrades from green to yellow performance, for example, yet the actual encoder rate is still operating better than the set rate, it may be acceptable to retain the green encoder rate until conditions otherwise warrant an adjustment.

Less dramatic adjustments in the encoder rate may also be performed as desired. If the network rate is less than the set encoder rate yet the buffer utilization is steadily rising, for example, it may be desirable to decrease the set encoder rate by ten percent (or so) to respond to the downward trend. Such trends may be caused by temporary network congestion (or other network effects), however, so it may not be desirable to use the network rate in setting the newly-selected encoder rate during such times. Further, it may be desirable in some instances to prevent inordinately large shifts in the encoder rate (e.g., shifts greater than 30% or so) for such transitions. Adjustments of this sort might not be performed until an appropriate delay (e.g., a second or so) has occurred following a prior adjustment.

In the preceding example, the encoding parameter (e.g., the bit rate of an encoded media stream or the like) can be adjusted based upon specific values that are observed and/or computed based upon the rate at which the buffer 105 fills and empties, thereby providing significantly greater flexibility and performance than prior techniques that relied solely upon watermark transitions or the like. This results in a significantly enhanced user experience.

As noted above, the particular adjustments, transitions, transition parameters, timing parameters and other specific features of the preceding example are intended solely for purposes of illustration, and are not meant to be limiting. Other embodiments may provide parameter rate adjustment techniques and systems that vary significantly from those described herein, and that use any number of alternate or additional parameters and parameter values.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method of encoding a media stream provided from an encoding system to a remotely-located media player, the method comprising:
   encoding the media stream at the encoding system according to at least one encoding parameter;
   gathering data about a transmit buffer that receives the encoded media stream within the encoding system;
   processing the gathered data about the transmit buffer to determine an estimate of network capacity and a calculated encoder rate, wherein the estimate of network capacity is based upon a rate of data leaving the transmit buffer;
   adjusting the at least one encoding parameter during subsequent encoding as a function of at least one of the estimate of network capacity and the calculated encoder rate; and
   transmitting the encoded media stream to the remotely-located media player.

2. The method of claim 1 wherein the encoding parameter is a bit rate of the media stream.

3. The method of claim 1 wherein the gathering comprises monitoring the amounts of data entering and leaving the transmit buffer.

4. The method of claim 1 wherein the estimate of network capacity is based upon a weighted average of the rate of data leaving the transmit buffer.

5. The method of claim 1 wherein the calculated encoder rate is based upon a rate of data entering the transmit buffer.

6. The method of claim 1 wherein the calculated encoder rate is based upon a weighted average rate of data entering the transmit buffer.

7. The method of claim 1 wherein the adjusting comprises adjusting the encoding parameter in response to changes in the estimate of network capacity.

8. The method of claim 1 further comprising adjusting the watermark value.

9. The method of claim 8 wherein the watermark value is automatically adjusted on a regular temporal basis.

10. The method of claim 1 further comprising disallowing further adjustments to the at least one encoding parameter for a time interval following a previous adjustment to the at least one encoding parameter.

11. The method of claim 10 further comprising adjusting the time interval based upon the previous adjustment.

12. The method of claim 1 wherein the adjusting is performed in response to a utilization of a processor associated with the encoding system.

13. The method of claim 1 wherein the encoding parameter corresponds to an encoding rate and the estimate of network capacity corresponds to an estimated rate at which the network empties the transmit buffer.

14. The method of claim 13 wherein the adjusting comprises setting the encoding rate to a predetermined percentage of the estimated rate at which the network empties the transmit buffer when the estimate of network capacity significantly exceeds the calculated encoder rate.

15. The method of claim 14 wherein the predetermined percentage is approximately eighty percent.

16. A system for encoding a media stream provided to a remotely-located media player, the system comprising:
   a transmit buffer;
   means for encoding the media stream according to at least one encoding parameter and for providing the encoded media stream to the transmit buffer;
   means for controlling the system, wherein the controlling means is configured to gather data about the utilization of the transmit buffer, to process the gathered data to determine an estimate of network capacity based upon a rate that the transmit buffer empties and a calculated encoder rate based upon a rate that the transmit buffer fills, and to adjust the at least one encoding parameter in the encoding means during subsequent encoding as a function of at least one of the estimate of network capacity and the calculated encoder rate; and
   means for transmitting the encoded media stream to the remotely-located media player.

17. A media encoding system for providing a media stream to a remote player over a network, the media encoding system comprising:
- a media encoding module configured to receiving an input signal and to encode the media stream according to at least one encoding parameter;
- a network interface configured to transmit the encoded media stream to the remote player over the network;
- a transmit buffer configured to be filled by the media encoding module and emptied by the network interface; and
- a control module configured to gather data about the transmit buffer, to process the gathered data determine an estimate of a network capacity based upon a rate that the transmit buffer empties and a calculated encoder rate based upon a rate that the transmit buffer fills, and to adjust the at least one encoding parameter during subsequent encoding as a function of at least one of the estimate of network capacity and the calculated encoder rate.

18. The media encoding system of claim 17 wherein the processor is further configured to adjust the encoding parameter to achieve a desired value of the encoder rate based upon the estimated network capacity.

* * * * *